(12) United States Patent
Shomura et al.

(10) Patent No.: US 7,644,157 B2
(45) Date of Patent: Jan. 5, 2010

(54) STATISTICAL INFORMATION COLLECTING SYSTEM AND APPARATUS THEREOF

(75) Inventors: Yusuke Shomura, Kokubunji (JP); Yoshinori Watanabe, Chigasaki (JP); Takeshi Shibata, Yokohama (JP)

(73) Assignee: Alaxala Networks Corporation, Kanagawa (JP)

( * ) Notice: Subject to any disclaimer, the term of this patent is extended or adjusted under 35 U.S.C. 154(b) by 409 days.

(21) Appl. No.: 11/700,155

(22) Filed: Jan. 31, 2007

(65) Prior Publication Data

US 2007/0271374 A1 Nov. 22, 2007

(30) Foreign Application Priority Data

May 18, 2006 (JP) .............................. 2006-138661
Nov. 30, 2006 (JP) .............................. 2006-324200

(51) Int. Cl.
*G06F 15/173* (2006.01)
(52) U.S. Cl. ........................ 709/224; 370/235; 370/252; 370/395.3
(58) Field of Classification Search ................ 370/235, 370/252, 395.3; 709/223, 224, 228
See application file for complete search history.

(56) References Cited

U.S. PATENT DOCUMENTS

| | | | | |
|---|---|---|---|---|
| 6,956,866 | B1* | 10/2005 | Li et al. ...................... | 370/449 |
| 2002/0143926 | A1* | 10/2002 | Maltz et al. ................. | 709/224 |
| 2004/0125815 | A1* | 7/2004 | Shimazu et al. ............. | 370/411 |
| 2005/0013300 | A1* | 1/2005 | Akahane et al. ........... | 370/395.3 |
| 2005/0213504 | A1* | 9/2005 | Enomoto et al. ............ | 370/235 |
| 2005/0276230 | A1* | 12/2005 | Akahane et al. ............. | 370/252 |
| 2006/0230167 | A1 | 10/2006 | Watanabe et al. | |
| 2007/0019550 | A1* | 1/2007 | Enomoto .................... | 370/235 |

FOREIGN PATENT DOCUMENTS

JP 2006-5402 6/2004

OTHER PUBLICATIONS

Phaal, P. et al., "InMon Corporation's sFlow: A Method for Monitoring Traffic in Switched and Routed Networks", Network Working Group, The Internet Society, Sep. 2001, pp. 1-28.

* cited by examiner

*Primary Examiner*—Oanh Duong
(74) *Attorney, Agent, or Firm*—Stites & Harbison PLLC; Juan Carlos A. Marquez, Esq.

(57) ABSTRACT

A statistical information collecting system and device for finding the detailed state of traffic flowing in a network to effectively reduce the traffic flow by sending statistical information from a statistical information collection apparatus to a collector device. A statistical information collection system with a statistical information collection apparatus comprising a collector device, in which the statistical information collection apparatus receives packets and collects statistical information from the received packets, and sends the collected statistical information to a collector device; the statistical information collection apparatus contains flow information including flow identification conditions for identifying flows that the received packets belong to, and sorts the statistical information on the collected packets for each flow identified by the flow identification conditions while referring to statistical information sorted for each flow, and the statistical information collection apparatus decides the transmit intervals for each flow for sending the statistical information to the collector device.

17 Claims, 16 Drawing Sheets

SAMPLING RATE CONTROL TABLE

| | SAMPLING RATE | | | |
|---|---|---|---|---|
| BAND (PPS) 501 | POST-ANALYSIS FLOW (0) | UNKNOWN FLOW (1) | ABNORMAL FLOW (2) 204 | |
| Default | 1/10,000 | 1/1,000 | 1/100 | |
| ~100 | 1/10,000 | 1/1,000 | 1/10 | |
| 101~1,000 | 1/10,000 | 1/1,000 | 1/100 | |
| 1,001~10,000 | 1/100,000 | 1/10,000 | 1/1,000 | |
| 10,001~100,000 | 1/1,000,000 | 1/100,000 | 1/10,000 | |
| 100,001~1,000,000 | 1/10,000,000 | 1/1,000,000 | 1/100,000 | |
| 1,000,001~10,000,000 | 1/100,000,000 | 1/1,0,000,000 | 1/1,000,000 | |
| 10,000,001~100,000,000 | 1/1,000,000,000 | 1/1000,000,000 | 1/10,000,000 | |

FLOW TABLE 206

| FLOW ID 301 | FLOW IDENTIFIER CONDITIONS 302 ||||||| STATISTIC CONTROL INFORMATION 303 |||||||
|---|---|---|---|---|---|---|---|---|---|---|---|---|---|---|
| | SOURCE IP ADDRESS | DESTINATION IP ADDRESS | PROTOCOL | SOURCE PORT NO. | DESTINATION PORT NO. | OTHER INFORMATION | REGISTRATION PROCESS | REGISTRATION PROCESS RATE | STATISTIC COLLECTION | SAMPLE PROCESS | TRANSMIT CONTROL | FLOW IDENTIFICATION | SAMPLING RATE | OTHER INFORMATION |
| F1 | IP_S1 | IP_D1 | TCP | SPORT1 | DPORT1 | * | 0 | – | 1 | 1 | 1 | 0 | 1/1,000 | ... |
| F2 | IP_S2 | IP_D2 | TCP | SPORT2 | DPORT2 | * | 0 | – | 1 | 1 | 1 | 0 | 1/10,000 | ... |
| F12 | * | * | TCP | * | * | * | 1 | 1/1 | 1 | 1 | 1 | 0 | 1/1,000 | ... |
| | 311 | 312 | 313 | 314 | 315 | 316 | 321 | 322 | 323 | 324 | 325 | 326 | 327 | 328 |

FIG. 4

STATISTICAL INFORMATION TABLE

| FLOW ID | STATISTICAL INFORMATION | | | | | | |
|---|---|---|---|---|---|---|---|
| | PACKETS (QTY) | BYTES (QTY) | BAND (BPS) | BAND (PPS) | START TIME | THRE-SHOLD | OTHER INFORMATION |
| F1 | P1 | B1 | 25Mdps | 30kpps | T1 | Th1 | ... |
| F2 | P2 | B2 | 10Mdps | 10kpps | T2 | Th2 | ... |
| F12 | – | – | – | – | – | – | ... |
| | | | | | | | |

FIG. 5

SAMPLING RATE CONTROL TABLE

| BAND (PPS) | SAMPLING RATE | | |
|---|---|---|---|
| | POST-ANALYSIS FLOW (0) | UNKNOWN FLOW (1) | ABNORMAL FLOW (2) |
| Default | 1/10,000 | 1/1,000 | 1/100 |
| ~100 | 1/10,000 | 1/1,000 | 1/10 |
| 101~1,000 | 1/10,000 | 1/1,000 | 1/100 |
| 1,001~10,000 | 1/100,000 | 1/10,000 | 1/1,000 |
| 10,001~100,000 | 1/1,000,000 | 1/100,000 | 1/10,000 |
| 100,001~1,000,000 | 1/10,000,000 | 1/1,000,000 | 1/100,000 |
| 1,000,001~10,000,000 | 1/100,000,000 | 1/1,0,000,000 | 1/1,000,000 |
| 10,000,001~100,000,000 | 1/1,000,000,000 | 1/1000,000,000 | 1/10,000,000 |

FIG. 10

ITEMSET TABLE 902

TABLE A 1101

| ENTRY NO. | ITEM A 1112 | |
|---|---|---|
| | TYPE | VALUE |
| E1_1 | Src IP | X1 |
| E1_2 | Src IP | X2 |
| E1_3 | DPORT | B3 |
| ⋮ | ⋮ | ⋮ |

1111  1121  1122

TABLE B 1102

| ENTRY NO. | ITEM A | | ITEM B | |
|---|---|---|---|---|
| | TYPE | VALUE | TYPE | VALUE |
| E2_1 | Src IP | X1 | Dst IP | Y1 |
| E2_2 | Src IP | X2 | Dst IP | Y2 |
| E2_3 | Dst IP | Y3 | SPORT | A3 |
| ⋮ | ⋮ | ⋮ | ⋮ | ⋮ |

TABLE C 1103

| ENTRY NO. | ITEM A | | ITEM B | | ITEM C | |
|---|---|---|---|---|---|---|
| | TYPE | VALUE | TYPE | VALUE | TYPE | VALUE |
| E3_1 | Src IP | X1 | ... | ... | DPORT | B1 |
| E3_2 | Src IP | X2 | ... | ... | DPORT | B2 |
| E3_3 | Dst IP | Y3 | ... | ... | DPORT | B3 |
| ⋮ | ⋮ | ⋮ | ⋮ | ⋮ | ⋮ | ⋮ |

TABLE D 1104

| ENTRY NO. | ITEM A | | ITEM B | | ITEM C | | ITEM D | |
|---|---|---|---|---|---|---|---|---|
| | TYPE | VALUE | TYPE | VALUE | TYPE | VALUE | TYPE | VALUE |
| E3_1 | Src IP | X1 | ... | ... | ... | ... | DPORT | B1 |
| E3_2 | Src IP | X2 | ... | ... | ... | ... | DPORT | B2 |
| E3_3 | Src IP | Y3 | ... | ... | ... | ... | DPORT | B3 |
| ⋮ | ⋮ | ⋮ | ⋮ | ⋮ | ⋮ | ⋮ | ⋮ | ⋮ |

FIG. 11

STATISTICAL INFORMATION TABLE

| ENTRY NO. 1111 | PACKETS (QTY) 1201 | BYTES (QTY) 1202 | BAND (BPS) 1203 | BAND (PPS) 1204 | START TIME 1205 | THRESHOLD 1206 | OTHER INFORMATION 1207 |
|---|---|---|---|---|---|---|---|
| E1_1 | P1_1 | B1_1 | BPS1_1 | PPS1_1 | t1_1 | Th1_1 | ... |
| E1_2 | P1_2 | B1_2 | BPS1_2 | PPS1_2 | t1_2 | Th1_2 | ... |
| E1_3 | P1_3 | B1_3 | BPS1_3 | PPS1_3 | t1_3 | Th1_3 | ... |
| ... | ... | ... | ... | ... | ... | ... | ... |
| E2_1 | P2_1 | B2_1 | BPS2_1 | PPS2_1 | t2_1 | Th2_1 | ... |
| E2_2 | P2_2 | B2_2 | BPS2_2 | PPS2_2 | t2_2 | Th2_2 | ... |
| E2_3 | P2_3 | B2_3 | BPS2_3 | PPS2_3 | t2_3 | Th2_3 | ... |
| ... | ... | ... | ... | ... | ... | ... | ... |
| E3_1 | P3_1 | B3_1 | BPS3_1 | PPS3_1 | t3_1 | Th3_1 | ... |
| E3_2 | P3_2 | B3_2 | BPS3_2 | PPS3_2 | t3_2 | Th3_2 | ... |
| E3_3 | P3_3 | B3_3 | BPS3_3 | PPS3_3 | t3_3 | Th3_3 | ... |
| ... | ... | ... | ... | ... | ... | ... | ... |

THRESHOLD CONTROL TABLE

| BAND (PPS) | THRESHOLD (RATE) | | |
|---|---|---|---|
| | POST-ANALYSIS FLOW (0) | UNKNOWN FLOW (1) | ABNORMAL FLOW (2) |
| Default | 10 | 1 | 1/10 |
| ~1000 | 10 | 1 | 1/100 |
| 101~1,000 | 10 | 1 | 1/10 |
| 1,001~10,000 | 100 | 10 | 1 |
| 10,001~100,000 | 1,000 | 100 | 10 |
| 100,001~1,000,000 | 10,000 | 1,000 | 100 |
| 1,000,001~10,000,000 | 100,000 | 10,000 | 1,000 |
| 10,000,001~100,000,000 | 1,000,000 | 100,000 | 10,000 |

SAMPLE INFORMATION TRANSMIT FORMAT

STATISTICAL INFORMATION COLLECTING SYSTEM AND APPARATUS THEREOF

CLAIM OF PRIORITY

The present application claims priority from Japanese application JP 2006-138661 filed on May 18, 2006, the content of which is hereby incorporated by reference into this application.

FIELD OF THE INVENTION

The present invention relates to a communication statistic collecting apparatus for collecting statistical information such as byte counts and the number of packets being transferred, and relates in particular to a statistical information collecting apparatus for sending statistical information to a collector device.

BACKGROUND OF THE INVENTION

The Internet is now an essential segment of our societal infrastructure. Besides the best effort type data conventionally used, data is now starting to be sent that requires guaranteeing the communication quality. Data whose communication quality must be guaranteed includes for example, transaction data for backbone jobs (essential business task) as well as audio and motion picture data. Moreover ADSL (Asymmetric Digital Subscriber Line) and FTTH (Fiber To The Home) technology is causing access lines to shift to broadband so that the volume of data being sent is vastly increasing.

Because of this type of environment, communication business operators and ISP (Internet Service Providers) require functions to monitor networks by collecting statistics on the volume of data being sent and received over network and to analyze those collected statistics, in order to determine the status of communications on the network.

Particularly needed among network monitoring functions, are functions for collecting statistical information on data groups (hereafter, called flows) sorted according to the data transmit source, data destination, application, and quality level, as well as functions for analyzing the statistical information of each flow.

When providing quality-guaranteed communication services, communication business operators and ISP can confirm whether or not communication quality is guaranteed or not by utilizing the statistical information in each flow. Traffic engineering (TE) is also utilized for making efficient use of network resources via the statistical information in each flow, in an environment where the volume of data being sent and received is increasing even though network resources are limited.

Moreover, utilizing statistical information on flows allows predicting customer demand and preparing network resources in advance, so that provisioning can be implemented to speedily provide network resources to meet user requests. Using statistical information to analyze flows also allows detecting and analyzing external computer attacks on the network. Further, billing and similar functions can also be contrived by using this statistical information on flows.

Functions to collect statistical information are contained in node devices such as switches, and routers that transfer packets over the network.

The statistical information collecting system includes a collector device for analyzing the overall network traffic based on statistical information sent from multiple statistical information collecting apparatuses dispersed throughout the network, and from statistical information sent from these statistical information collecting apparatuses.

One method for collecting statistical information on flows is a sampling flow statistical technique is disclosed (See IETF RFC3176 "InMon Corporation's Flow: A Method for Monitoring Traffic in Switched and Routed Networks"). In the statistical information collecting system disclosed in IETF RFC3176 "InMon Corporation's Flow: A Method for Monitoring Traffic in Switched and Routed Networks", a router serving as the statistical information collecting apparatus copies the received packet and selectively sends the copied packets to the collector device. The collector device then identifies the flow from the packets that were sent, and collects and analyzes the statistical information.

Routers contained in the statistical information collecting system sample the received packets according to a sampling rate set in advance by the network administrator, places the sampled packet copies in a specified capsule format and sends this to the collector device.

The collector device extracts the copied packet from the packet sent from the router, identifies the flow based on the copied packet header information and, information for identifying added flows if necessary, and rewrites the statistical information for each flow.

An expanded sampling type statistical information collecting system is disclosed (See JP-A No. 5402/2006) as a technology for sampling in flow units. In contrast to the flow statistic technology of IETF RFC3176 "InMon Corporation's Flow: A Method for Monitoring Traffic in Switched and Routed Networks", where packets are sampled at a fixed (specified) rate from among packets received by a router, in the flow statistic technology of disclosed in JP-A No. 5402/2006, the flow is identified from header information in the packet received by the router, and the packets are sampled at a rate set for each flow.

SUMMARY OF THE INVENTION

The flow statistic technology disclosed in IETF RFC3176 "InMon Corporation's Flow: A Method for Monitoring Traffic in Switched and Routed Networks", capsules the header information the router received from the packet and a portion of the data, and sends the information to the collector device. Therefore, in order for the router to monitor the flow statistical information in detail, a large sampling rate must be set, the packets must be frequently sampled, and sent to the collector device.

However, increasing the sampling rate also increases the processing load on the router. A larger sampling rate also increases the communication volume (quantity) between the router and collector device, and increases the processing load on the collector device.

Therefore collecting flow information with satisfactory accuracy was impossible in core routers handling a large communication volume. Also, determining the flow on a small bandwidth was impossible, even on routers handling a comparatively small communication volume (little traffic flow).

The flow statistic technology in JP-A No. 5402/2006, carried out sampling in flow unit, only sampled the flows to be monitored, and then sent these to the collector device. By limiting the sampling flow in this way, this technology reduced the router processing load, the communication volume (hereafter communication load or flow) between router and collector device, and the processing load on the collector device.

Sometimes however, abnormal traffic cannot be detected in the flow selected for sampling, or the statistical information traffic flow cannot be reduced. Therefore correctly selecting flows to monitor was impossible in the technology disclosed in JP-A No. 5402/2006.

A typical aspect of this invention includes: a statistical information collecting apparatus including a first processor for computational processing, a first memory area connected to the first processor and, a first interface connected to the first processor and; a collector device including a second processor for computational processing, a second memory area connected to the second processor and, a second interface connected to the statistical information collecting apparatus connected to the second processor; and the statistical information collecting apparatus with a first processor for receiving the packets, collecting statistical information from the received packet, and sending the collected statistical information to the collector device is characterized in that the first memory area contains flow information including flow identification conditions for identifying flows belonging to the received packet, and the first processor sorts the statistical information on the collected packets for each flow identified by the flow identification conditions, refers to the statistical information sorted according to each flow, and send the statistical information to the collector device.

The embodiment of this invention automatically controls the statistical information received by the collector device according to the flow band and type, to reduce the communication flow between the collector device and statistical information collecting apparatus, and also reduce the processing load on the statistical information collecting apparatus and collector apparatus, and improve the analysis accuracy of the statistical information.

BRIEF DESCRIPTION OF THE DRAWINGS

FIG. 3 is a drawing showing a flow table of the first embodiment of this invention;

FIG. 4 is a drawing showing a statistical information table of the first embodiment of this invention;

FIG. 5 is a drawing showing a sampling rate control table of the first embodiment of this invention;

FIG. 10 is a drawing showing the item setting table of the second embodiment of this invention;

FIG. 11 is a drawing showing the statistical information table of the second embodiment of this invention;

FIG. 12 is a drawing showing the threshold control table of the second embodiment of this invention;

DETAILED DESCRIPTION OF THE PREFERRED EMBODIMENTS

Figure 1:
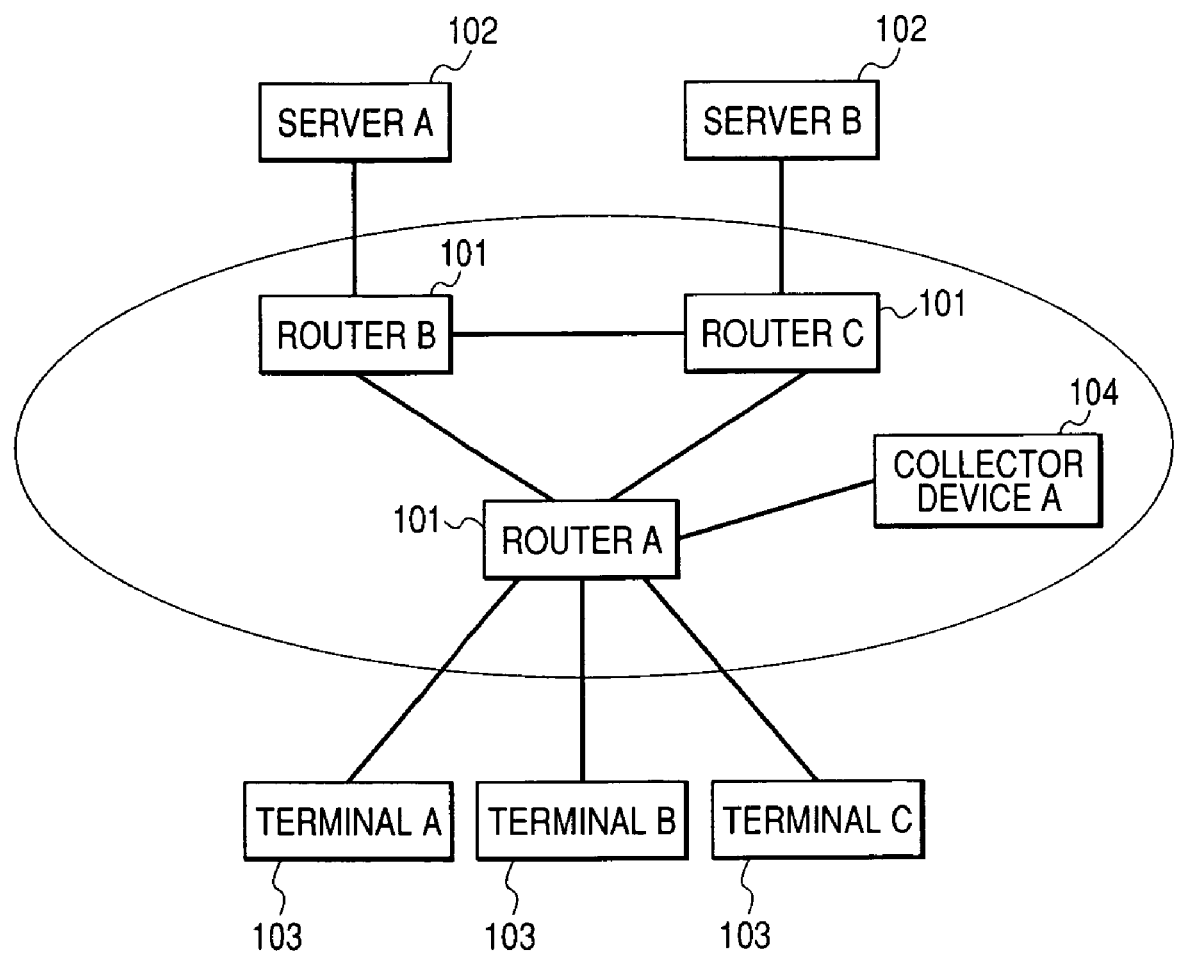
FIG. 1 is a block diagram for illustrating the communication statistical information collecting system of the first embodiment of this invention.

The preferred embodiments of this invention are described next while referring to the drawings.

First Embodiment

The first embodiment of this invention is described while referring to the drawings from FIG. 1 through FIG. 8, and FIG. 15.

FIG. 1 is a block diagram for illustrating the statistical information collecting system of the first embodiment of this invention.

The statistical information collecting system contains a router 101, a server 102, a terminal 103, and a collector device 104. These devices are all connected over a network. An ISP (Internet Service Provider) for example provides the network. The network may be an intra-company network.

More specifically, the terminal A103, terminal B103, and the terminal C103 are connected to the router A101. The server A102 is connected to the router B101, and the server C102 is connected to the router C101. The collector device A104 is connected to the router A101. Also the router A101, router B101, and the router C101 are all connected.

The router 101 is a device for transferring information communicated over the network to other destinations for that information. The router 101 contains a processor, a storage device and an interface. The router 101 collects the communicated statistical information, and send that collected statistical information to a collector device 104.

Figure 2:
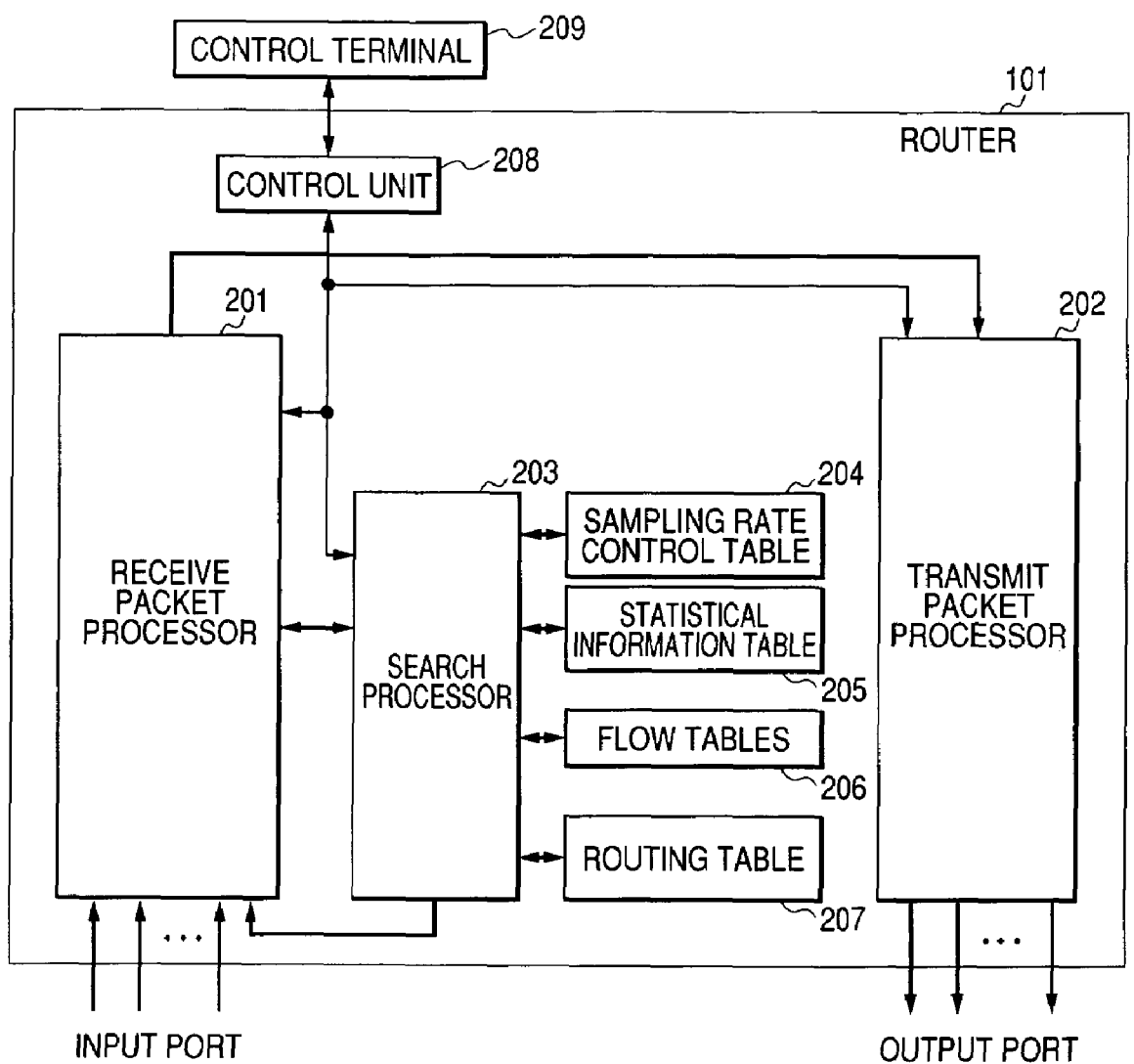
FIG. 2 is a functional block diagram of the router of the first embodiment of this invention.

FIG. 2 is a functional block diagram of the router 101 in the first embodiment of this invention.

The router 101 includes a receive packet processor unit 201, a transmit packet processor unit 202, a search processor unit 203, a sampling rate control table 204, a statistical information table 205, a flow table 206, a routing table 207, and a control unit 208.

The control terminal 209 is connected to the control unit 208. The administrator can change each parameter type set in the receive packet processor unit 201, the transmit packet processor unit 202, and the search processor unit 203 via this control terminal 209. The control terminal 209 may be connected to the control unit 208 via the network.

The receive packet processor unit 201 receives the packets via the input port. The receive packet processor unit 201 accumulates the received packets in a buffer, and sends the header information in these accumulated packets to the search processor unit 203.

Figure 6:
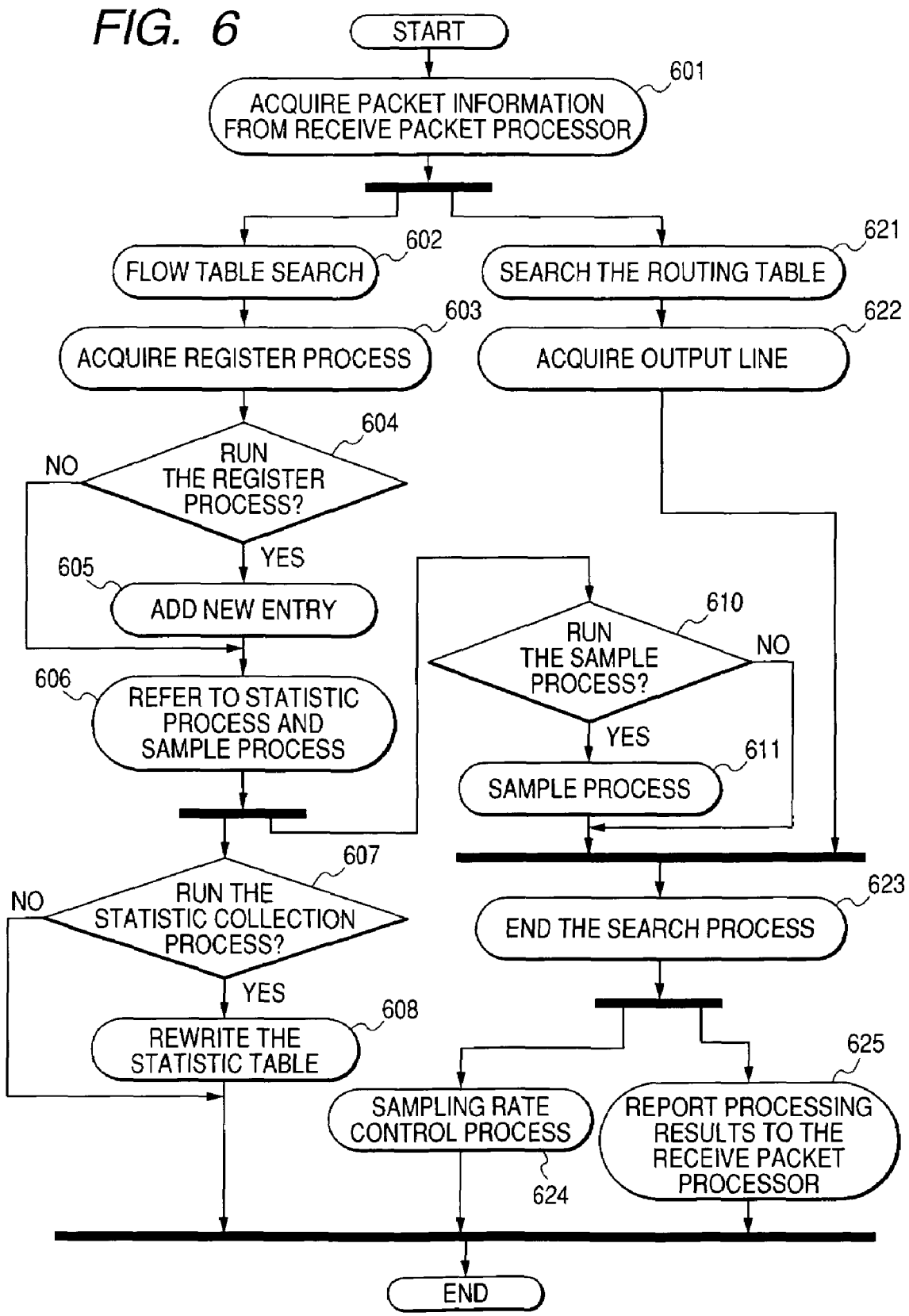
FIG. 6 is a flow chart showing the operation of the search process in the first embodiment of this invention.

The search processor unit 203 sends the search process results to the receive packet processor unit 201 after receiving the header information from the receive packet processor unit 201 and executing the search process. The search process in FIG. 6 is described in detail.

When the search results are received from the search processor unit 203, the receive packet processor unit 201 sends a packet to the transmit packet processor 202 based on the output report contained in the search results.

When the search results received by the receive packet processor unit 201 include an instruction to sample packets, the receive packet processor unit 201 sends; header information containing instructions for encapsulating the applicable packet; instruction to encapsulate the sampling rate utilized in the sampling process, and the capsule header information; and packet header information containing encapsulated header information and the sampling rate utilized in the sampling process; to the applicable transmit packet processor unit 202. The search results received by the receive packet processor unit 201 contain encapsulated header information and the sampling rate utilized in the sampling process.

The operation of the transmit packet processor unit 202 is described. The transmit packet processor unit 202 sends an output packet containing the search results when the packet and the search results are received from the receive packet processor unit 201.

When the transmit packet processor unit 202 receives search results containing encapsulated instructions, the transmit packet processor unit 202 creates an IP packet from the encapsulated header information contained in the search results, sends the packet executed in the search process inserted in a data section to the collector device 104.

Figure 15:
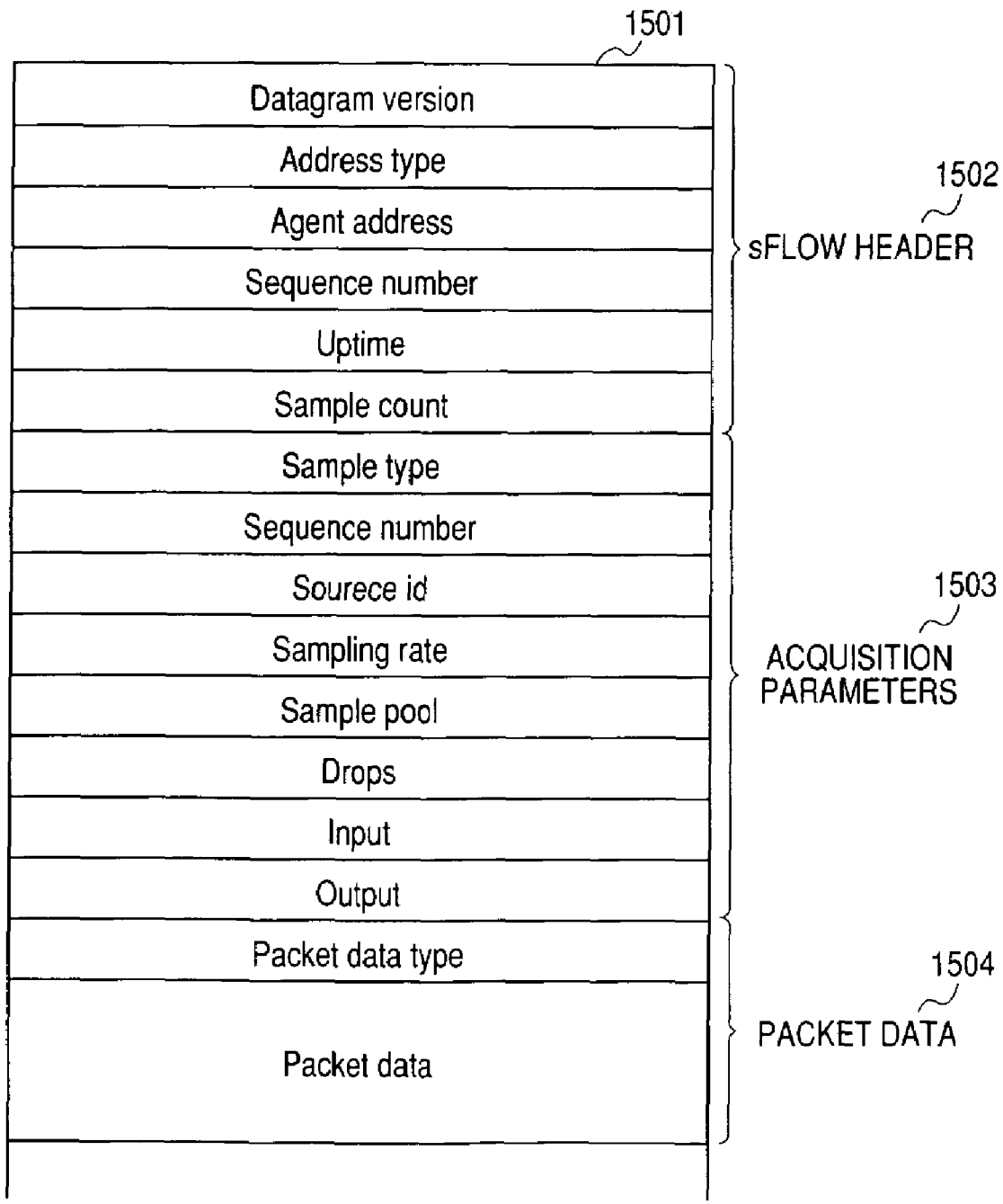
FIG. 15 is a drawing showing the sample information transmit format of the first embodiment of this invention.

A typical format for a packet sent by transmit packet processor unit 202 to the collector device 104 is shown in FIG. 15. The sample information transmit format 1501 includes an sFlow header 1502, an acquisition parameter 1503, and a packet data 1504. The sample information transmit format 1501 is sent as a UDP datagram. The transmit packet processor unit 202 sets the sampling rate utilized in the sampling process received from the receive packet processor unit 201, into the sampling rate of the acquisition parameter 1503.

Figure 7:
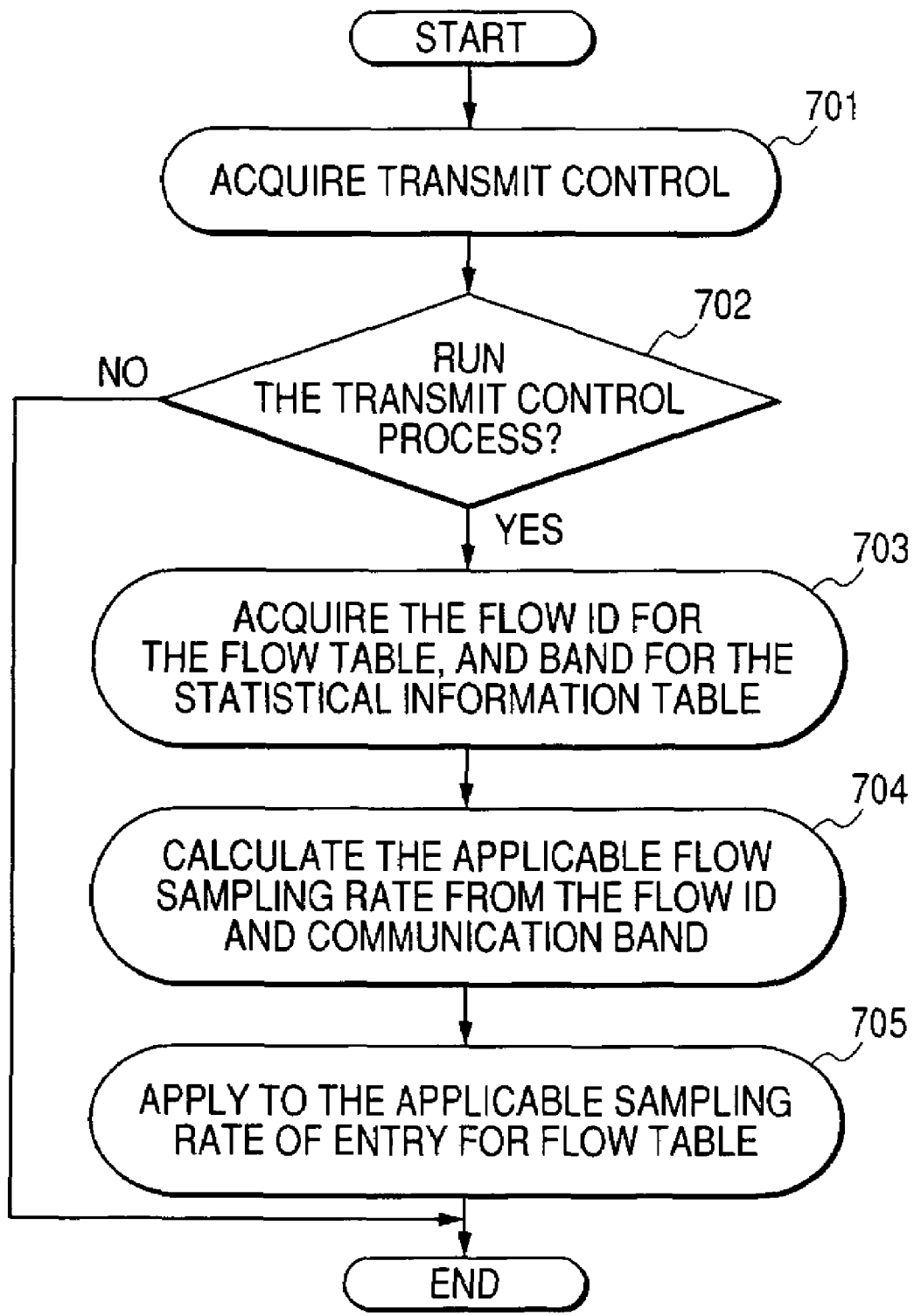
FIG. 7 is a flow chart of the sampling rate control process unit in the first embodiment of this invention.

The sampling rate control table 204 manages the sampling rates matching the flow type and flow band, and the sampling processor unit 203 refers to this table when implementing the sampling rate control process (FIG. 7).

The statistical information table 205 manages the statistical information in each of the collected flows. The flow table 206 includes information serving as conditions for specifying the packet flow received by the router, and information showing the process executed on that flow. An output port matching the transmit source IP address and the destination IP address is registered in the routing table 207.

FIG. 3 is a drawing showing the flow table 206 of the first embodiment of this invention.

The flow table 206 includes flow identification condition 302 and statistic control information 303. The flow identification condition 302 includes a source IP address 311, a destination IP address 312, a protocol 313, a source port No. 314, a destination port No. 315, and other information 316.

An IP address for the transmit source that sent the packet received by the router 101 is registered in the source address 311. A destination IP address for the packet received by the router 101 is registered in the destination IP address 312. The TCP and the UDP are for example registered in the protocol 313.

The port No. for the transmit source that sent the packet received by the router 101 is registered in the source port No. 314. A destination port No. for the packet received by the router 101 is registered in the destination port NO. 315.

A packet input/output (I/O) port No., a transmit source MAC address, a destination MAC address, a TAG protocol identifier, a VLAN (Virtual LAN) identifier, a priority level, a TOS and a portion of the TCP flag are for example registered in the other information 316.

The statistic control information 303 contains a register process 321, a register process rate 322, a statistic collection 323, a sample process 324, a transmit control 325, a flow type 326, a sampling rate 327, and other information 328.

Information on whether or not there is a new entry in the flow table 206 is registered in the register process 321. The search process unit 203 registers the new entry when a "1" is registered in the register process 321. However, when a "0" is registered in the register process 321, then the search process unit 203 registers no entry.

When a new entry is registered in the flow table 206, then the register rate of that entry is registered in the register process rate 322. When a "1/1" is registered in the register process rate 322, the search process unit 203 always adds a new entry. When a "0" is registered in the register process 321, then no new entry was registered so a "-" is registered in the register process rate 322.

A "1/1" is registered in the register process rate 322 of the flow ID "F12". If any of the flow conditions is a mismatch, and if the protocol 313 is TCP, then the flow ID "F12" automatically adds a new entry to the flow table 206.

Information on whether or not statistical information was collected is registered in the statistic collection 323. If a "1" was registered in the statistic collection 323 then statistical information was collected for the applicable entry. However, if a "0" was registered in statistic collection 323, then not statistical information was collected for the applicable entry.

Information on whether or not the sampling process was executed is registered in the sampling process 324. In the sampling process, the transmit packet process unit 202 copies the packet according to the sampling rate, and sends the copied packet to the collector device 104.

When a "1" is registered in the sampling process 324, then the sampling process is executing using the value registered in the sampling rate 327. When a "0" is registered in the sampling process 324, then the sampling process is not executed.

Information on whether or not the transmit control process was executed is registered in the transmit control 325. The transmit control process is a process for changing values registered in the sampling rate 327 and is described in detail using FIG. 7. The transmit control process is executed when a "1" is registered in the transmit control 325.

The flow type is registered in the flow type 326. For example either a "0" a "1" or a "2" is registered in the flow type 326. A "0" indicates an unknown flow. A flow newly registered in the flow table 206 is an unknown flow. A "1" indicates that analysis of the flow is complete. Flows that are determined to be safe are flows whose analysis is complete. A "2" indicates an abnormal flow. Flows determined to be abnormal are abnormal flows.

A value of "3" or higher may be registered in the flow type 326 to show the degree of abnormality of the abnormal flow.

The collector device 104 searches the statistical information on each flow, decides the flow type, and sends the now determined flow type to the router 101. When the router 101 receives the flow type 326 from the collector device 104, it registers the flow type in the flow type 326 of the flow table 206 via the control unit 208. The router 101 may also register the flow type 326 and the administrator may register it via the control terminal 209.

The rate at which the sampling process is executed is registered in the sampling rate 327. If for example a "1/1000" is registered in the sampling rate 327, then the sampling process was executed at a ratio of 1 to 1000 packets.

The sampling start conditions and the sampling end conditions are registered in the other information 328.

FIG. 4 is a drawing showing the statistical information table 205 of the first embodiment of this invention.

The statistical information table 205 includes a flow ID 301 and statistical information 401.

The flow ID 301 corresponds to the statistical information 401 and flow identification condition 302 functioning as a joint ID with flow ID 301 of the flow table 206. Instead of the method for matching the statistical information 401 with the flow identification condition 302 utilizing a joint (or common) ID, a method may be used that matches the statistical information 401 with the flow identification condition 302 utilizing a pointer; and a method for storing the flow table 206 and the statistical information table 205 in one table may be utilized.

The statistical information 401 includes a packet quantity 411, a byte quantity 412, a band (bps) 413, a band (pps) 414, a start time 415, a threshold 416, and other information 417.

A value integrating the packet quantity received from the router 101 is registered in the packet quantity 411. A 1 is added to the packet quantity 411 when the router 101 receives a packet matching the flow ID 301.

A value integrating the packet length in the packet received from the router 101 is registered in the byte quantity 412. The router 101 adds the packet length contained in the header information of the received packet to the byte quantity 412 when the router 101 receives the packet matching the flow ID 301.

A flow exclusively for the band (bps) is registered in the band (bps) 413. A flow (pps) exclusively for the flow is registered in the band (pps) 414.

The time that a 1 was registered in the packet quantity 411, is registered in the start time 415. In other words, the time that a packet matching the first flow ID was received by the router 101, is registered.

Information on thresholds as a condition for sending statistical information to the collector device 104 or not are registered in the threshold 416 in order to analyze the statistical information. Usually, the threshold for the packet quantity 411 is registered in the threshold 416. When the packet quantity 411 reaches the threshold registered in the threshold 416, the router 101 sends statistical information on the appropriate flow to the collector device 104. The flow analysis process unit 805 of the collector device 104 then analyzes the statistical information for the flow.

Thresholds relating to the byte quantity 412 and the start time 415 may be registered in the threshold 416.

The number of types that appeared in items not contained in the flow ID, and the time that the router 101 last received the packet are registered in the other information 417. Here, the number of types that appeared, indicates for example, what types of destination IP addresses appeared when the flow identification condition 302 of flow table 206 contained a transmit source IP address.

FIG. 5 is a drawing showing the sampling rate control table 204 of the first embodiment of this invention.

The sampling rate control table 204 contains a band (pps) 501 and a sampling rate 502.

The band (pps) 501 corresponds to the band (pps) 414 of statistical information table 205. The band bps 413 of statistical information table 205 may be used rather than the band (pps).

Values registered in the sampling rate 327 for each flow type 326 of flow table 206 are registered in the sampling rate 502. More specifically, the sampling rate 502 contains analyzed flows (0) 511, unknown flows (1) 512, and abnormal flows (2) 513 registered in the corresponding sampling rate 327.

The search processor unit 203 searches the sampling rate control table 204 to register a suitable sampling rate 327 in the flow table 206 from the band and flow types.

The control terminal 209 can changes the registered contents from the control terminal 209 via the control unit 208.

FIG. 6 is a flow chart showing the search process in the first embodiment of this invention.

The search processor unit 203 receives the header information from the receive packet process unit 201 (step 601).

When the header information is received, the search processor unit 203 searches the flow table 206 (step 602). The search processor unit 203 also searches the routing table 207 (step 621) when the header information is received (step 601). The process in step 602 through 611, and the process in step 621 through 622 are performed in parallel.

More specifically, in the process of step 602, the search processor unit 203 searches the flow identification condition 302 of flow table 206 and identifies the flow ID 301 based on the transmit source IP address, the destination IP address, the transmit source port No., and the destination port No. contained in the received header information.

The search processor unit 203 then implements the statistic process of step 603 through step 611 based on the statistic control information 303 of the identified flow ID 301.

The search processor unit 203 searches the flow table 206, and acquires the information registered in the register process 321 (step 603).

The search processor unit 203 next decides whether or not to add the new entry (step 604). More specifically, when the information registered in the register process 321 acquired in the process in step 603 is "1", then the search processor unit 203 decides to add the new entry and proceeds to the process of step 605. On the other hand, when the information registered in the register process 321 acquired in the process in step 603 is "0", then the search processor unit 203 decides not to add the new entry and the proceeds to the process in step 606.

The search processor unit 203 then adds the new entry to the flow table 206 based on the register process rate 322 (step 605).

The search processor unit 203 then searches the sample process 324 and the statistic collection 323 of the flow table 206 (step 606). The processing then branches into the process of step 607 and the process of step 610.

The search processor unit 203 searches the flow table 206 and decides whether or not to execute the statistic collection process (step 607). More specifically, when the information registered in the statistic collection 323 is "1", the search processor unit 203 decides to execute the statistic collection process and the process proceeds to step 608. However, when the information registered in the statistic collection 323 is other than "1", then the search processor unit 203 decides not to execute the statistic collection process and the statistic processing ends.

When the decision is made to execute the statistic collection process in step 607, the search processor unit 203 rewrites the statistical information table 205 (step 608).

More specifically, the search processor unit 203 adds a 1 to the packet quantity 411 of the identified flow ID, and adds the packet length contained in the header information received in the byte quantity 412. The search processor unit 203 then registers the measured band (bps) and the band (pps) into the band (bps) 413 and the band (pps) 414.

The search processor unit 203 in parallel with the process of step 607, searches the flow table 206, and decides whether or not to execute the sampling process (step 610). More specifically, the search processor unit 203 decides not to execute the sampling process when other than the information "1" is registered in the sample process 324. On the other hand, when the information registered in the sampling process 324 is "1", then the search processor unit 203 decides to execute the sampling process, and the process proceeds to step 611.

When the decision is made to execute the sampling process in step 610, the search processor unit 203 executes the sampling process by utilizing the value registered in the sampling rate 327 (step 611). More specifically, the search processor unit 203 adds an instruction to execute the sampling process in the search results to sent to the receive packet processor unit 201. Also, when the transmit packet processor unit 202 executes the sampling process, the search processor unit 203 adds the header information for encapsulating the packet, to the search results.

When the header information of step 601 is received, the search processor unit 203 searches the routing table 207 (step 621). The search processor unit 203 searches the routing table 207 and acquires the output port (step 622).

The search processor unit 203 then adds the information from the output port acquired in the process of step 622 to the search results, and the search process ends (step 623). When the sampling process was executed in the process of step 611, the search processor unit 203 instructs that the sampling be executed, and adds the sampling rate utilized in the sampling process and the header information for encapsulating, to the search results.

When the search process ends (step 623), the search processor unit 203 executes the sampling rate control process (step 624). The sampling rate control process is described in detail using FIG. 7. When the search process ends (step 623), the search processor unit 203 sends the search results to the receive packet processor unit 201 (step 625).

FIG. 7 is a flow chart showing the sampling rate control process in the first embodiment of this invention (step 624).

The search processor unit 203 searches the flow table 20.6 and acquires the information registered in the transmit control 325 (step 701).

The search processor unit 203 next decides whether or not to execute the transmit control process based on the information registered in the acquired transmit control 325 (step 702). More specifically, when the information registered in the acquired transmit control 325 is a "1", then the search processor unit 203 decides to execute the transmit control process and the process proceeds to step 703. On the other hand, when the information registered in the acquired transmit control 325 is other than a "1", then the search processor unit 203 decides not to execute the transmit control process, and the sampling rate control process ends.

After deciding to execute the transmit control process, the search processor unit 203 acquires the flow type 326 of flow table 206 and the band (pps) 414 of statistical information table 205 (step 703).

The search processor unit 203 searches the sampling rate control table 204 and calculates a sampling rate corresponding to the acquired flow type 326 and the band (pps) 414 (step 704).

If the band (pps) 414 was not measured, then a search is made for a sampling rate corresponding to the "Default" of band (pps) 501 of the sampling rate control table 204.

The sampling rate value calculated in the process in step 704 is registered in the sampling rate 327 of the flow ID 301 of the matching flow table 206 step 705.

The sampling control process ends when a new sampling rate is registered in the flow table 206.

In the present embodiment, the search processor unit 203 searched the sampling rate control table 204 and calculated the sampling rate; however, the sampling rate may also be calculated with a calculation method utilizing the band and the flow type.

The example described the search processor unit 203 of router 101 actively changing the sampling rate 327; however, the collector device 104 may actively change the sampling rate. A method where the collector device 104 actively changes the sampling rate 327 is described in detail in FIG. 8.

The administrator may also change the sampling rate manually via the control terminal 209.

Figure 8:
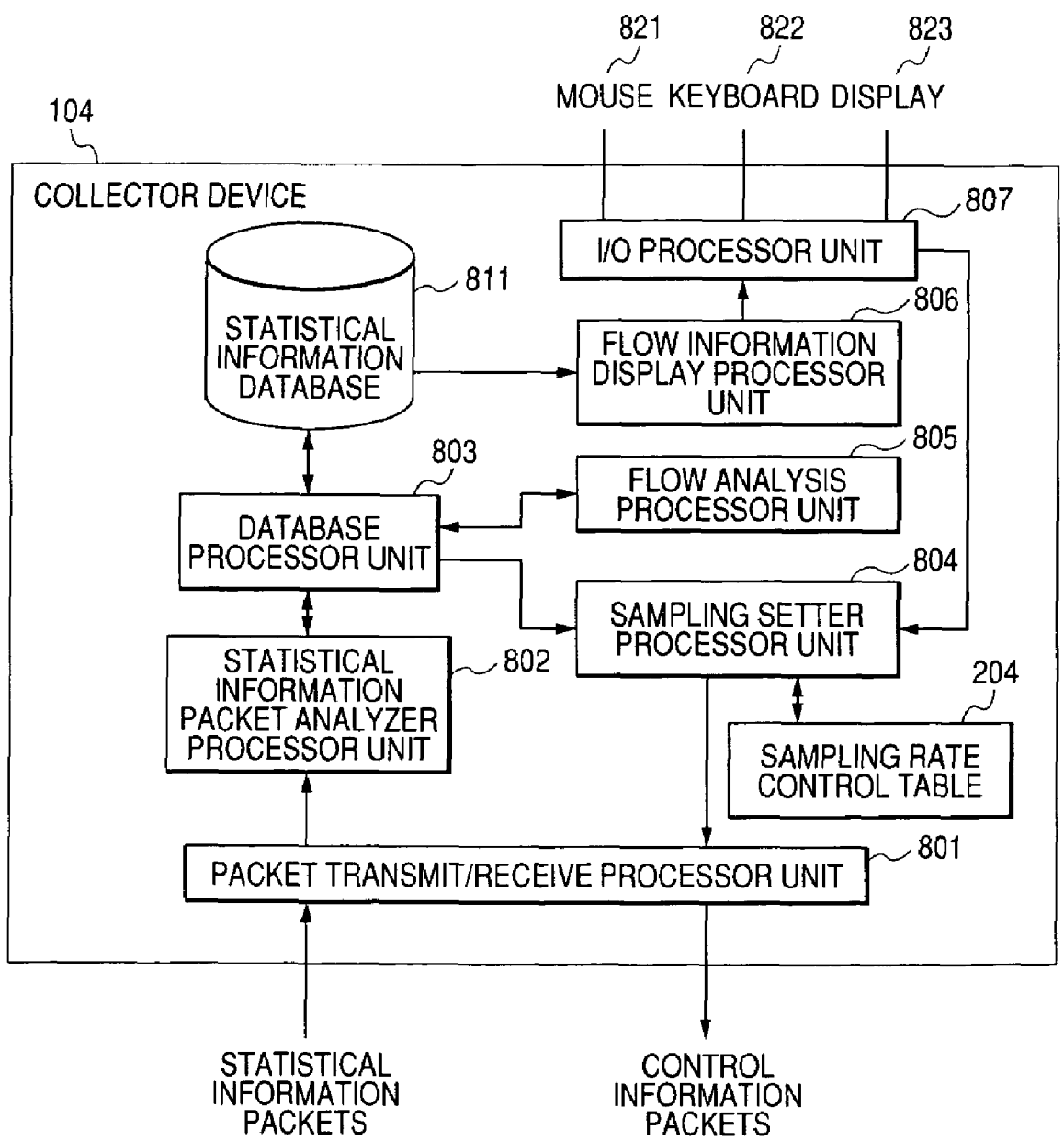
FIG. 8 is a function block diagram for the collector device 10 of the first embodiment of this invention.

FIG. 8 is a function block diagram of the collector device 104 of the first embodiment of this invention.

The collector device 104 contains a packet transmit/receive processor unit 801, a statistical information packet analysis processor unit 802, a database control unit 803, sampling setting processor unit 804, flow analysis processor unit 805, flow report display processor unit 806, input/output processor unit 807, and sampling rate control table 204.

An input/output device (mouse 821, keyboard 822 and display 823) is connected to the input/output processor unit 807 of the collector device 104. A terminal computer is connected to the collector device 104 over the network, and inputs and outputs may be made via input and output devices to that terminal computer.

The packet transmit/receive processor unit 801 receives statistical information packets from the router 101. The packet transmit/receive processor unit 801 transmits control information packets.

The statistical information packet analysis processor unit 802 extracts the header information from the packet executed by the sampling processor contained in the statistical information packet. The statistical information packet analysis processor unit 802 sends the extracted header information to the database control unit 803.

The database control unit 803 rewrites (updates) the statistical information database 811 based on the header information received from the statistical information packet analysis processor unit 802. The database control unit 803 measures the band of the flow belonging to the packet executed by the sampling process. The database control unit 803 sends the sampling rate, flow type, and the measured flow band to the sampling setting processor unit 804.

When the flow the that sample-processed packets belong to satisfies the conditions set in the thresholds, the database control unit 803 sends flow information matching the statistical information database 811 to the flow analysis processor unit 805. Conditions set in the threshold are when the figure is same or higher than specified for the flow packet quantity, or when the same or higher than the specified flow band (bps or pps).

The database control unit 803 searches the statistical information database 811 based on conditions for searching the statistical information database 811 sent from the flow analysis processor unit 805, and sends the search results to the flow analysis processor unit 805.

The database control unit 803 receives the analysis results from the flow analysis processor unit 805 and registers or rewrites the flow type of the statistical information database 811 based on the received analysis results.

The sampling setting processor unit 804 searches the sampling rate control table 204 and calculates the sampling rate for the appropriate flow based on the band, flow type and sampling rate received from the database control unit 803. The sampling setting processor unit 804 then instructs the packet transmit/receive processor unit 801 to send the calculated sampling rate to the router 101 as the control information packet.

The administrator can directly set the sampling rate via the mouse 821 or the keyboard 822 input device. The collector device 104 sends the set sampling rate to the router 101.

The flow analysis processor unit 805 receives the information from the statistical information database 811 that the packet executed in the sampling process from the database control unit 803. The flow analysis processor unit 805 analyzes the flow type of the appropriate flow, based on the received statistical information database 811 information. The flow analysis processor unit 805 sends the results from analyzing the flow type of the appropriate flow to the database control unit 803.

If necessary, the flow analysis processor unit 805 sends search conditions on information relating to the appropriate flow from the statistical information database 811 to the database control unit 803.

The flow report display processor unit 806 receives statistical information from the statistical information database 811. The flow report display processor unit 806 sorts the statistical information or forms the statistical information into graphs.

The sampling setting processor unit 804 calculates the sampling rate and by sending the calculated sampling rate to the router 101, the collector device 104 changes the sampling rate 327 contained in the flow table 206.

The router 101 that received the sampling rate calculated by the sampling setting processor unit 804, rewrites (or updates) the sampling rate 327 of flow table 206 via the search processor unit 203 and the control unit 208. If there is no flow ID matching the flow rewritten in the flow table 206, then the router 101 adds a new entry to the flow table 206.

If the collector device 104 has rewritten the sampling rate 327 of flow table 206, then the router 101 sets the transmit control 325 to "0", and the sampling rate cannot then be changed by the router 101.

Second Embodiment

Figure 16:
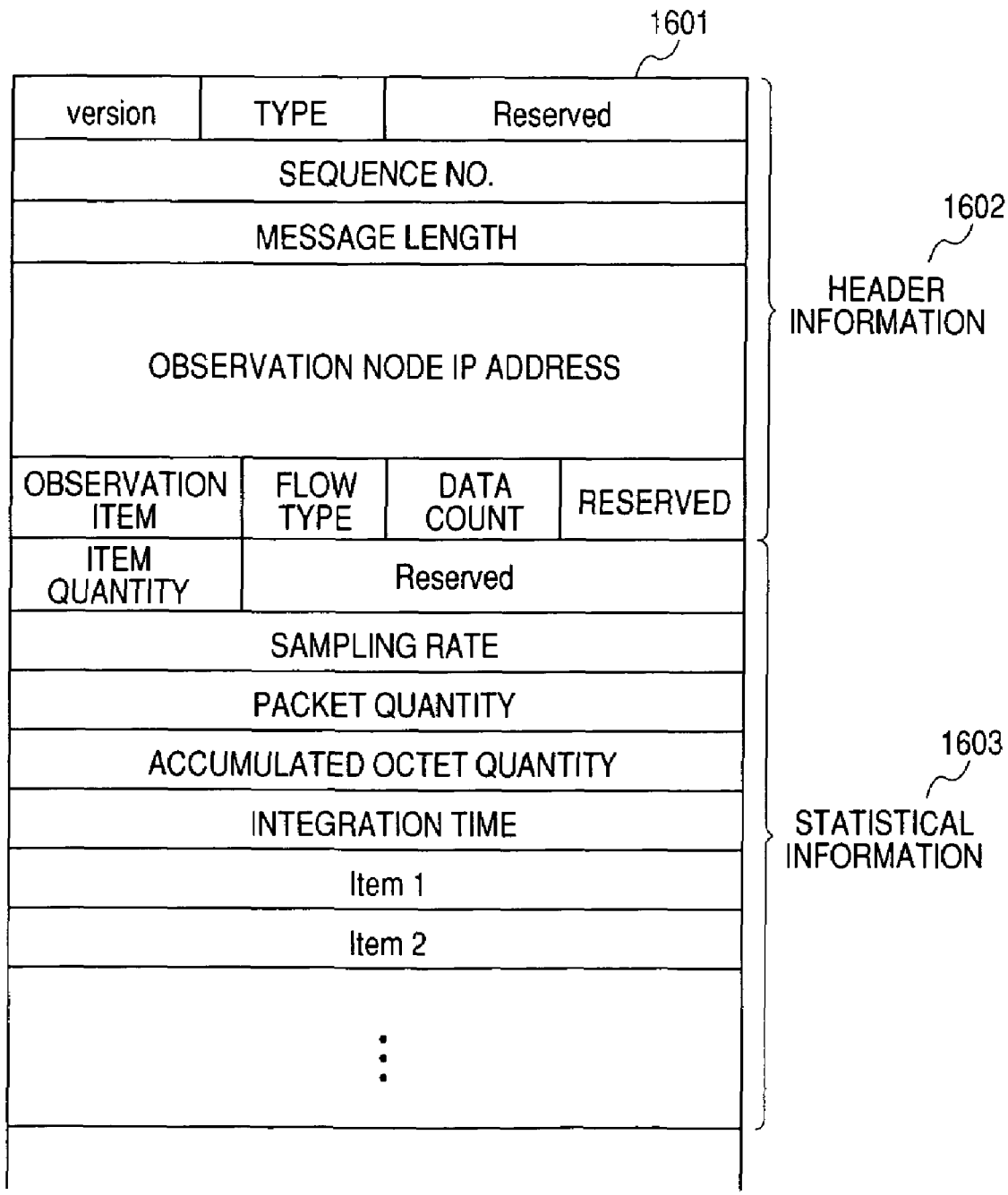
FIG. 16 is a drawing showing the statistical information transmit format of the second embodiment of this invention.

The second embodiment of this invention is described while referring to FIG. 9 through FIG. 13, as well as FIG. 16. Structural elements identical to the first embodiment are assigned the same reference numerals and their description is omitted.

The router 101 of this embodiment contains a function for analyzing statistical information for the flow as does the router 101 of the first embodiment of this invention.

Figure 9:
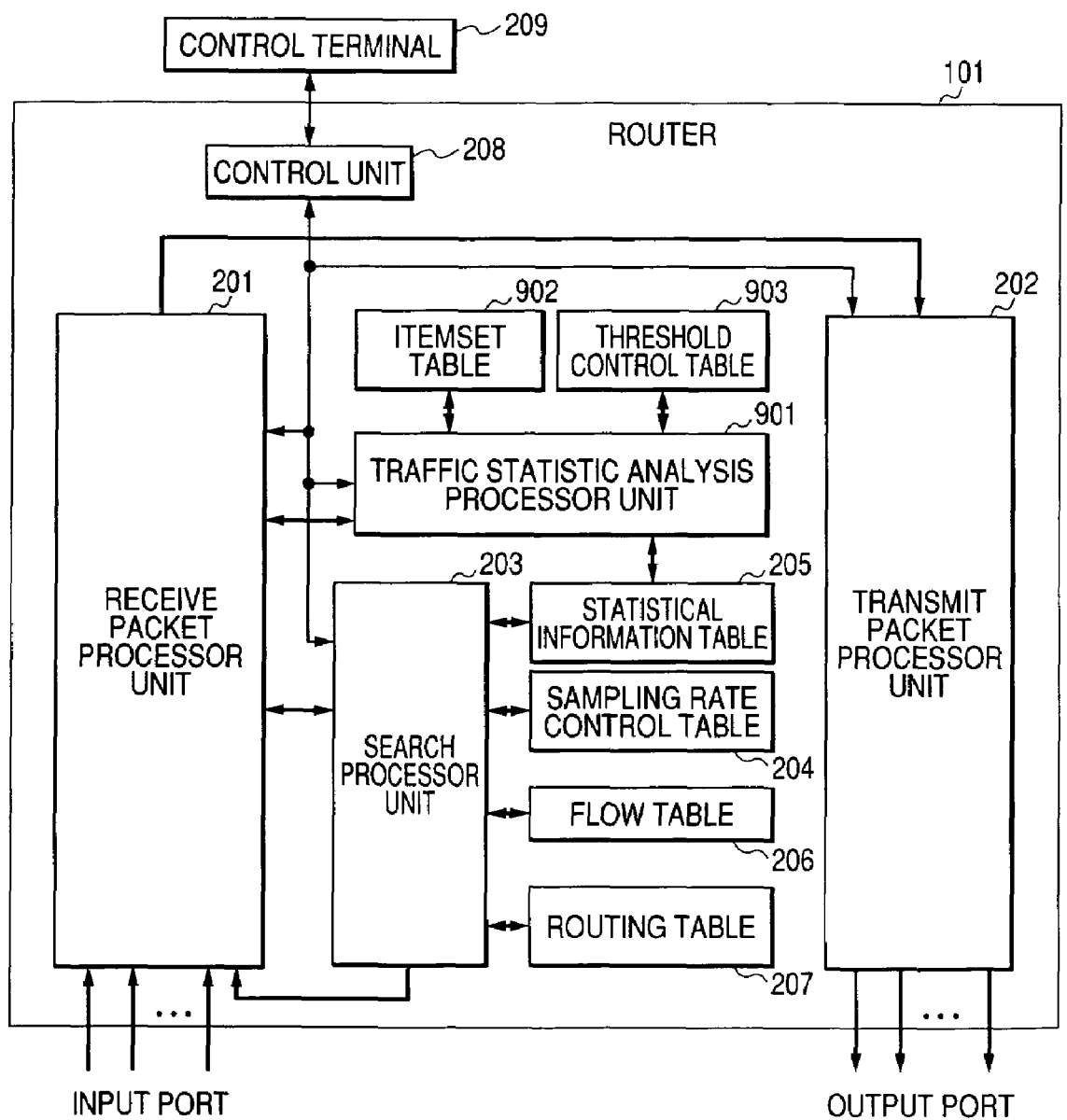
FIG. 9 is a function block diagram for the router of the second embodiment of this invention.

FIG. 9 is a function block diagram of the router 101 of the second embodiment.

The router 101 contains a receive packet processor unit 201, a transmit packet processor unit 202, a search processor unit 203, a traffic statistic analyzing processor unit 901, a sampling rate control table 204, a statistical information table 205, a flow table 206, a routing table 207, an itemset table 902, a threshold control table 903, and a control unit 208.

The search processor unit 203 and the traffic statistic analyzing processor unit 901 search the statistical information table 205.

The traffic statistic analyzing processor unit 901 generates an itemset table 902 combining optional items making up the traffic information, and extracts characteristic (or unique) traffic by collecting statistical information on each entry in the itemset table 902.

The itemset table 902 shows an optional combination of each of the items making up the traffic information. The itemset table 902 is described in detail using FIG. 10. The threshold control table 903 is searched when the threshold value 1206 of the statistical information table 205 is changed according to the flow band and flow type. The threshold control table 903 is described in detail using FIG. 12.

FIG. 10 is a drawing showing the itemset table 902 of the second embodiment of this invention.

There are four types of items making up the traffic information in this embodiment. These items are the transmit source IP address, the destination IP address, the transmit. source port No., and the destination port No. Other items making the traffic information may for example be the transmit source MAC address, the destination MAC address, the VLAN-ID, the protocol No. the priority level, the TOS, and the TCP flag, etc.

The itemset table 902 includes tables made from combinations of optional items making up the traffic information.

The itemset table 902 in this embodiment includes a table A1101, a table B1102, a table C1103, and a table D1104. The table A1101 is a first item making up the traffic information. The table B1102 is a second item making up the traffic information. The table C1103 is a third item making up the traffic information. The table D1104 is a fourth item making up the traffic information.

The example in this embodiment describes the case where the number of tables in the itemset table 902 is four tables. The itemset table 902 contains at least one table, and there are four types of items making up the traffic information so that the itemset table 902 contains up to a maximum of four tables. Each table in the itemset table 902 contains an entry No. 1111 and an item 1112.

The entry No. 1111 is an entry identifier contained in the itemset table 902. The item 1112 contains the type 1121 and the value 1122. Items making up the traffic information are registered in the type 1121. A value for the item making up the traffic information recorded in the type 1121 is registered in the value 1122.

FIG. 11 is a drawing showing the statistical information table 205 of the second embodiment of this invention.

The traffic statistic analyzing processor unit 901 and the search processor unit 203 search the statistical information table 205.

The statistical information table 205 contains an entry No. 1111, a packet quantity 1201, a byte quantity 1202, a band (bps) 1203, a band (pps) 1204, a start time 1205, a threshold 1206, and other information 1207.

The entry No. 1111 is a common identifier for entry numbers in the flow table 206 and the itemset table 902, and corresponds to the itemset table 902 and statistical information table 205.

In this embodiment, the traffic statistic analyzing processor unit 901 and the search processor unit 203 search one statistical information table 205. However, the statistical information table searched by the traffic statistic analyzing processor unit 901, and the statistical information table searched by the search processor unit 203 may each be separately retained tables.

An integrated value of packet quantities received by the router 101 may be registered in the packet quantity 1201. More specifically, when the router 101 receives a packet matching the entry No. 1111, the router 101 adds a 1 to the packet quantity 1201.

An integrated value for the packet length contained in the packet received by the router 101 is registered in the byte quantity 1202. When the router 101 receives a packet matching the entry No. 1111, the router 101 adds the packet length contained in the header information of the received packet to the byte quantity 1202.

A band (bps) exclusively for the matching entry No. is registered in the band (bps) 1203. A band (pps) exclusively for the matching entry No. is registered in the band (pps) 1204.

The time where a 1 was registered in the byte quantity 1201 is registered in the start time 1205. In other words, the time that the router 101 initially received the packet matching the flow ID is registered.

The condition when the statistic table maker 1002 sends information to the flow analysis unit 1003 is registered in the threshold 1206. The threshold (value) for the packet quantity 1201 is usually registered in the threshold 1206. When the packet quantity 1201 reaches the value registered in the threshold 1206, the statistic table maker 1002 sends that information to the flow analysis unit 1003.

The threshold (values) relating to the byte quantity 1202 and the start time 1205 may be registered in the threshold 1206.

The number of types that appeared in items not contained in the item 1101 of the itemset table 902, and the time that the router 101 last received the packet are registered in the other information 1207. For example, when the transmit source IP address is included in the in the itemset table 902, then the number of types that appeared in the destination IP address item which is the item not contained in the itemset table 902.

FIG. 12 is a drawing showing the threshold control table 903 of the second embodiment of this invention.

The threshold control table 903 contains the band (pps) 1401 and the threshold 1402.

The band (pps) 1401 corresponds to the band (pps) 1204 of the statistical information table 205. The band utilizes pps; however, bps may be utilized.

The threshold ratio for each flow is registered in the threshold 1402. When the threshold 1206 of statistical information table 205 is the threshold of packet quantity 1201, then a value multiplied by the ratio registered in the threshold 1402 per the threshold established for each entry No. 1111 specified by the itemset table 902, is set in the threshold 1206 of the statistical information table 205.

The threshold control table 903 is searched for an suitable value to register in the threshold 1206 of statistical information table 205 from the band and flow types. The threshold control table 903 can be changed from the control terminal 209 via the control unit 208.

Figure 13:
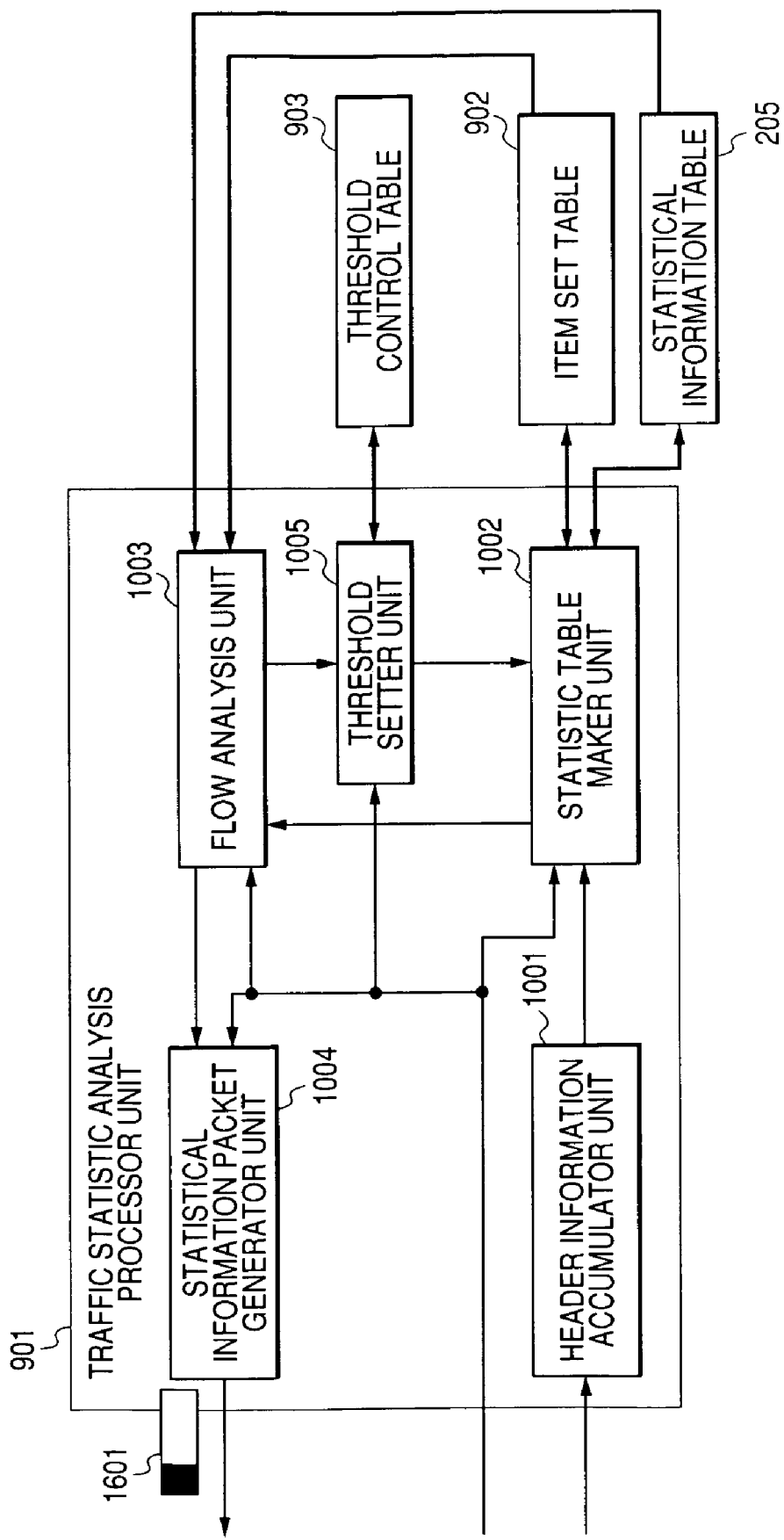
FIG. 13 is a function block diagram of the traffic statistic analysis processor unit of the second embodiment of this invention.

FIG. 13 is a function block diagram of the traffic statistic analysis processor unit 901 of the second embodiment of this invention.

The traffic statistic analysis processor unit 901 includes a header information accumulator 1001, the statistic table maker unit 1002, the flow analysis unit 1003, the statistical information packet generator unit 1004, and the threshold setter unit 1005.

The header information accumulator 1001 receives header information from the receive packet processor unit 201, and sends the received header information to the statistic table maker unit 1002.

The statistic table maker unit 1002 generates an optional combination of items (transmit source IP address, destination IP address, transmit source port No., and destination port No.) making up the traffic information in the header information that was received. The statistic table maker unit 1002 then searches the itemset table 902, and searches for entries matching the combination that was generated.

If there is a matching entry in the itemset table 902, then the statistic table maker unit 1002 changes (or rewrites) the packet quantity 1201, byte quantity 1202, band (bps) 1203, band (pps) 1204, start time 1205, and threshold 1206 for the applicable statistical information table 205 based on the entry No. 1111 for the matching entry.

On the other hand, if there is no matching entry in the itemset table 902, then the statistic table maker unit 1002 adds an entry for the newly generated combination in the itemset table 902 and the statistical information table 205.

If unable to add a new entry to the itemset table 902 or statistical information table 205, then the entry to be newly added is overwritten onto a previously registered entry. Methods for selecting a previously registered entry to overwrite include: a method for selecting an entry where the packet quantity 1201 of statistical information table 205 is small; a method for selecting an entry where the last updated (rewritten) entry is the oldest entry; and a method for selecting entries randomly.

When adding a new entry, the combination of items making up the generated traffic information is registered in the itemset table 902. A "1" is registered in the packet quantity 1201 of the statistical information table 205, and the packet length contained in the header information is registered in the byte quantity 1202. The bands measured by the router 101 are registered in the band (bps) 1203 and the band (pps) 1204.

The time that a 1 was registered in the packet quantity 1201 is registered in the start time 1205. A preset value is registered in the threshold 416. The preset value registered in the threshold 416 is set for each combination of itemset table 902, and can be changed by the administrator via the control unit 208.

The method used by the statistic table maker unit 1002 to change the entries in the statistical information table 205 is described. The description used the packet flow from the terminal 1 of FIG. 1 to the server 1 as an example. Here, the terminal 1 IP address is set as X1, the server 1 IP address as Y1, the transmit source port No. as A1, and the destination port NO. as B1.

When header information from the header information accumulator 1001 is received, the statistic table maker unit 1002 registers the transmit source IP address and X1 each in the type 1121 and the value 1122 of table A1101; and registers entries where the transmit source IP address is X1. The statistic table maker unit 1002 in the same way, registers entries that are the destination address Y1, entries where the transmit source port No. is A1, entries where the destination port No. is B1 in the table A1101. The statistic table maker unit 1002 in this way rewrites or newly forms the table A1101.

The statistic table maker unit 1002 registers the transmit source IP address and X1 each into the type 1121 and the value 1122 contained in item A of the table B1102; registers the destination IP address and Y1 each into the type 1121 and value 1122 contained in item B; and registers entries where the transmit source IP address is X1 and the destination IP address is Y1. The statistic table maker unit 1002 in the same way registers entries where the transmit source IP address is X1 and the transmit source port No. is A1; entries where the transmit source IP address is X1 and the destination port No. is B1, entries where the destination IP address is Y1 and the transmit source port No. is A1; entries where the destination IP address is Y1 and the destination port No. is B1; as well as entries where the transmit source port No. is A1 and the destination port No. is B1; into the table B1102. The statistic table maker unit 1002 in this way rewrites or newly forms the table B1102.

The statistic table maker unit 1002 in the same way, registers entries where the transmit source IP address is X1 and the destination IP address is Y1, and transmit source port No. is A1; entries where the transmit source IP address is X1 and the destination IP address is Y1, and the destination port No. is B1; entries where the transmit source IP address is X1 and the transmit port No. is A1, and destination port No. is B1; as well as where the destination IP address is Y1 and the transmit port No. is A1 and the destination port is B1; in the table C1103. The statistic table maker unit 1002 in this way rewrites or newly forms the table C1103.

The statistic table maker unit 1002 in the same way, registers entries where the transmit source address is X1, the destination IP address is Y1, the transmit source port source No. is A1, and destination port No. is B1; in the table D1104. The statistic table maker unit 1002 in this way rewrites or newly forms the table D1104.

In this embodiment, the statistic table maker unit 1002 registered all item combinations in the itemset table 902 but omissions can be made if needed.

The entries just for the transmit source IP address X1 and the destination port No. B1 for example can be registered in the table B1102, and other combinations not registered in table B1102. The administrator sets the combinations for registry in each table via the control unit 208.

When the itemset table 902 and the statistical information table 205 are rewritten, the statistic table maker unit 1002 searches the threshold 1206 of statistical information table 205, and decides whether or not to send the information to the flow analysis unit 1003.

The statistic table maker unit 1002 usually compares the threshold 1206 and the packet quantity 1201 contained in the statistical information table 205. More specifically, when the packet quantity 1201 is larger than the threshold 1206, the statistic table maker unit 1002 decides to send information on entries applicable to the itemset table 902 and the statistical information table 205 to the flow analysis section 1003, and that information is judged by the flow analysis section 1003.

The statistic table maker unit 1002 registers a "0" in the entry (packet quantity 1201, byte quantity 1202, start time 1205, and other information 1207) for the applicable statistical information table 205 simultaneous with sending the information to the flow analysis section 1003. Preset values are registered in the threshold 1206.

When the packet quantity 1201 is lower than the threshold 1206, the statistic table maker unit 1002 decides not to send entry information matching the statistical information table 205 and the itemset table 902 to the flow analysis section 1003.

The threshold for the byte quantity 1202, the threshold for the start time 1205, and the threshold for the other information 1207 may be registered in the threshold 1206. In this case, the statistic table maker unit 1002 searches the byte quantity 1202, the start time 1205, and the other information 1207 according to the threshold 1206, and decides whether or not to send the information to the flow analysis section 1003.

The statistic table maker unit 1002 searches the start time 415 and when deciding whether or not to send information to the flow analysis unit 1003, subtracts the start time 1205 from the current time, calculating the consecutive time. The statistic table maker unit 1002 then compares the calculated consecutive time with the threshold 1206. If the calculated continuous time is larger then the threshold 1206, then the statistic table maker unit 1002 decides to send the information to the flow analysis unit 1003. However, if the calculated continuous time is smaller then the threshold 1206, then the statistic table maker unit 1002 decides not to send the information to the flow analysis unit 1003.

The statistic table maker unit 1002 holds information on what threshold information the threshold 1206 contained in the statistical information table 205. The administrator can make changes from the control unit 208.

In this embodiment, the statistic table maker unit 1002 searches one threshold 1026; however, multiple thresholds may be searched.

The statistical information table 205 in this case contains multiple thresholds. When a preset number of thresholds among multiple thresholds are satisfied, then the statistic table maker unit 1002 sends the applicable entry information to the flow analysis unit 1003.

A threshold for the packet quantity 1201 is for example registered in a first threshold, and a threshold relating to the start time 1205 is registered in a second threshold. When the first threshold is satisfied, and the second threshold is also satisfied, the statistic table maker unit 1002 sends the applicable entry information to the flow analysis unit 1003. When at least one among the first threshold or the second threshold is satisfied then the statistic table maker unit 1002 may send entry information to the flow analysis unit 1003.

When the threshold 1206 is a value common to all the entries, in other words a threshold was not set in the flow, the usable memory capacity may be conserved by holding a common threshold for all entries in the table maker unit 1002, and not holding a threshold 1206 in the statistical information table 205.

The flow analysis unit 1003 decides the traffic band and the type based on applicable entry information in statistical information table 205 and itemset table 902 sent from the statistic table maker unit 1002.

If necessary, the flow analysis unit 1003 searches other entry information from the statistical information table 205 and itemset table 902, and analyzes the entry type.

Statistical information for matching entries and results analyzed in the flow analysis unit 1003 are sent to the statistical information packet generator 1004. The band of the entry and entry type, and the entry No. 1111 are also sent to the threshold setter unit 1005. The flow analysis unit 1003 also sends statistical information for those entries to the control unit 208 when analysis shows an abnormality in the entry type.

The statistical information packet generator 1004 forms the statistical information and the analysis results received from the flow analysis unit 1003 into a transmit format, and sends this to the receive packet processor unit 201 of router 101.

FIG. 16 is a drawing showing an example of the statistical information transmit format 1601 sent to the receive packet processor unit 201 by way of the statistical information packet generator 1004. The statistical information transmit format 1601 includes the header information 1602 and the statistical information 1603. The statistical information transmit format 1601 is sent as SCTP, TCP, or UDP datagrams.

The statistical information 1603 contains a sampling rate utilized for collecting the statistical information and, statistical information collected by the statistical information table 205 and, item 1102 of the itemset table 902. The address of the collector device 104 serving as the transmit destination for the statistical information is set beforehand by the administrator via the control unit 208 into the statistical information packet generator 1004.

The threshold setter unit 1005 searches the threshold control table 903, and calculates the threshold 1206 for deciding the interval for sending information to the flow analysis unit 1003 from the statistic table maker unit 1002 based on the entry type and the entry band received from the flow analysis unit 1003. More specifically, the threshold setter unit 1005 searches the threshold control table 903, and calculates the ratio corresponding to the applicable entry band (pps) and the applicable entry type. The threshold setter unit 1005 then sends this calculated ratio to the statistic table setter 1002.

The statistic table maker unit 1002 multiplies the received ratio by the value registered in the applicable entry for the threshold 1206, to calculate the new threshold 1206. The statistic table maker unit 1002 then registers that calculated value into the applicable entry for the threshold 1206.

The function added to the receive packet processor unit 201 of the first embodiment is described next.

When the receive packet processor unit 201 of this embodiment receives a packet, it also sends header information to the traffic statistic analyzing processor unit 901 simultaneously with sending header information to the search processor unit 203. The receive packet processor unit 201 sends the statistical information packet received from the traffic statistic analyzing processor unit 901 to the transmit packet processor unit 202. The other operation of the receive packet processor unit 201 is the same as that of the first embodiment.

The control unit 208 of this embodiment sends the information that the entry type received from the flow analysis unit 1003 of the traffic statistic analyzing processor unit 901 is abnormal to the search processor 203. The search processor unit 203 that received the information of the abnormality, searches for a matching entry in the flow table 206, and if there is a matching entry, sets the abnormal flow in the flow type 326.

The other operation of the transmit packet processor unit 202, and the search processor unit 203 is identical to that of the first embodiment.

Third Embodiment

Figure 14:
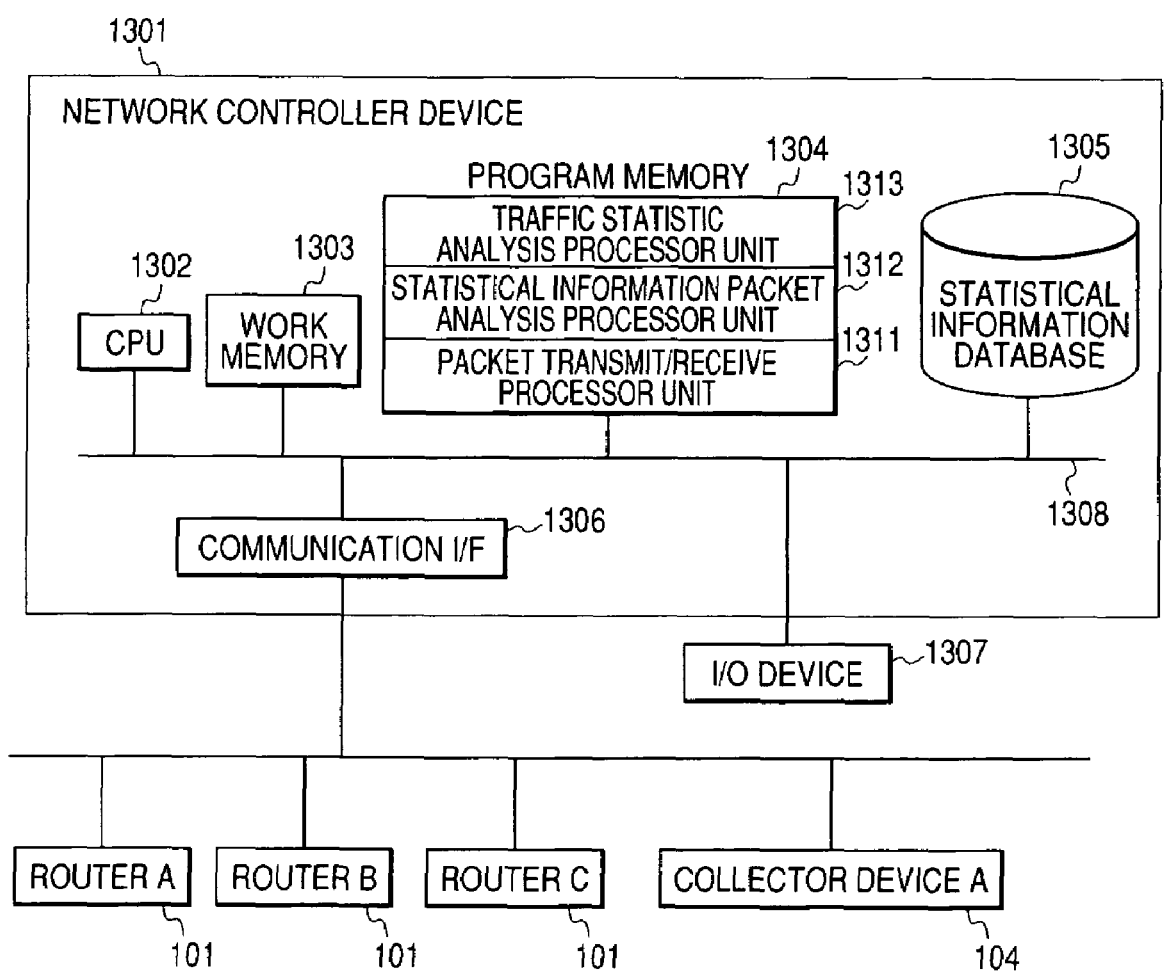
FIG. 14 is a function block diagram of the statistical information collection apparatus of the third embodiment of this invention.

The third embodiment of this invention is described while referring to FIG. 14.

In the third embodiment of this invention, the network control device 1301 contains a function of to analyze the traffic statistics of the second embodiment.

FIG. 14 is a function block diagram of the network control device 1301 of the third embodiment of this invention.

The network control device 1301 contains a CPU (Central Processing Unit) 1302, a work memory 1303, a program memory 1304, a statistical information database 1305, a communication interface (communication I/F) 1306, and an input/output device 1307. These components are respectively connected via a bus 1308.

A packet send/receive processor unit 1311, a statistical information packet analysis processor unit 1312, a traffic statistic analysis processor unit 1313 are stored in the program memory 1304. The CPU 1302 loads the respective programs stored in the program memory 1304, into the work memory, and executes the programs.

The packet send/receive processor unit 1311 sends and receives the IP packets. The statistical information packet analysis processor unit 1312 acquires the header information contained in the packet sent from the router 101. The traffic statistic analysis processor unit 1313 executes the same processing as the traffic statistic analyzing processor unit 901 of the second embodiment. The embodiments differ in the point that though the traffic statistic analyzing processor unit 901 of the second embodiment sends the packets generated by the statistical information packet generator unit 1004 to the receive packet processor unit 201; the traffic statistic analysis processor unit 1313 of the present embodiment sends the packets generated by the statistical information packet generator unit 1004 to the packet send/receive processor unit 1311.

The statistical information database 1305 contains an itemset table 902 and a statistical information table 205. The traffic statistic analysis processor unit 1313 searches the statistical information database 1305.

The router 101 possesses the same structure as the first embodiment. Header information of the packet that was sample-processed by the router 101 is sent to the network control device 1301 and the collector device 104.

When the packet quantity passing through the router 101 is small, the packet is copied, and the copied packet is sent to the network control device 1301.

The present invention is capable of network management processing. This invention is especially effective when applied to detailed management of traffic flowing on the network as well as to large-scale networks.

What is claimed is:

1. A statistical information collecting system comprising: a statistical information collecting device including a first processor for computational processing, a first memory area connected to the first processor, a first interface connected to the first processor; and a collector device including a second processor for computational processing, a second memory area connected to the second processor, and a second interface connected to the statistical information collecting device and connected to the second processor; and the first processor receives packets, collects the statistical information of the received packets, and sends that collected statistical information to the collector device, flow information including flow identification conditions for identifying each flow that the received packets belongs to are stored in the first memory area, wherein the first processor sorts the collected statistical information of the packets into said each flow identified by the flow identification conditions, and searches the collected statistical information that was sorted into the flows, and decides a transmit interval for said each flow for sending the statistical information to the collector device, and wherein the statistical information contains a band of the each flow, wherein the first processor sets a predetermined sampling interval of the received packets based on the flow band contained in the collected statistical information and a flow type of said each flow, samples the received packets at the predetermined sampling interval, and sends sampled packet header information as the collected statistical information to the collector device.

2. The statistical information collecting system according to claim 1, wherein the first memory area stores the conditions for collecting the statistical information, and wherein the first processor collects the statistical information based on the conditions for collecting the stored statistical information.

3. The statistical information collecting system according to claim 1, wherein the first processor decides the sampling interval of the received packets based on results from analyzing statistical information sorted into flows, and samples the received packets at that decided sampling interval, and sends the header information of the sampled packet as the statistical information to the collector device.

4. The statistical information collecting system according to claim 3, wherein the second processor analyzes the statistical information that sorted into flows when the statistical information from the first processor was received, and sends the analyzed results for the statistical information to the first processor, and wherein the first processor decides the sampling interval of the received packet based on the received analysis results when the analysis results for the statistical information are received.

5. The statistical information collecting system according to claim 3,
   wherein the first processor analyzes the statistical information that was sorted into flows, and
   decides the sampling interval of the received packet based on the analysis results for the statistical information.

6. The statistical information collecting system according to claim 3,
   wherein threshold values relating to statistical information sorted into flows is set in each flow, and
   wherein the first processor decides whether or not to analyze the statistical information sorted into flows, based on threshold values set in the flows where the received packets belong.

7. The statistical information collecting system according to claim 6,
   wherein the statistical information contains the flow band, and
   wherein the first processor rewrites the threshold value relating to statistical information sorted into flows, based on at least one among the analyzed results of the statistical information and the flow bands.

8. The statistical information collecting system according to claim 3,
   wherein a threshold value relating to statistical information sorted into flows is set in each flow, and
   wherein the second processor decides whether or not to analyze the statistical information sorted into flows, based on threshold values set in the flows of received statistical information, when statistical information was received from the first processor.

9. The statistical information collecting system according to claim 8,
   wherein the statistical information contains the flow band, and
   wherein the second processor rewrites the threshold value relating to statistical information sorted into flows, based on at least one among the analyzed results of the statistical information and the flow bands.

10. The statistical information collecting system according to claim 1, wherein the predetermined sampling interval is established based on a look-up table.

11. A statistical information collecting device including a processor for computational processing, a memory area connected to the processor, an interface connected to the processor and connected to a collector device, the statistical information collecting device receiving packets, collecting statistical information from the received packets, and sending the collected statistical information to the collector device, flow information including flow identification conditions for identifying each flow that the received packets belong to are stored in the memory area, and wherein the processor sorts the collected statistical information of the packets into said each flow identified by the flow identification conditions, and searches the collected statistical information that was sorted into the flows, and decides a transmit interval for said each flow for sending the collected statistical information to the collector device, and
   wherein the collected statistical information contains a band of said each flow, and
   wherein the processor sets a predetermined sampling interval of the received packets based on the flow band contained in the collected statistical information and a flow type of said each flow,
   samples the received packets at the predetermined sampling interval, and
   sends sampled packet header information as the statistical information to the collector device.

12. The statistical information collecting device according to claim 11,
    wherein the memory area stores conditions for collecting the statistical information, and
    wherein the processor collects the statistical information based on the conditions for collecting the stored statistical information.

13. The statistical information collecting device according to claim 11,
    wherein the processor decides the sampling interval of the received packet based on results from analyzing statistical information sorted into flows,
    samples the received packets at that decided sampling intervals, and
    sends the header information of the sampled packet as the statistical information to the collector device.

14. The statistical information collecting device according to claim 13,
    wherein the processor analyzes the statistical information that was sorted into flows, and
    decides the sampling interval of the received packet based on the analysis results for the statistical information.

15. The statistical information collecting device according to claim 13,
    wherein a threshold value relating to statistical information sorted into flows is set in each flow, and
    wherein the processor decides whether or not to analyze the statistical information sorted into flows, based on threshold values set in the flow where the packet belongs when the packet was received.

16. The statistical information collecting device according to claim 15,
    wherein the processor rewrites the threshold value relating to statistical information sorted into flows, based on the analyzed results of the statistical information.

17. The statistical information collecting system according to claim 11, wherein the predetermined sampling interval is established based on a look-up table.

* * * * *